United States Patent
Niessen et al.

(10) Patent No.: US 12,051,908 B2
(45) Date of Patent: Jul. 30, 2024

(54) DEVICE AND METHOD FOR CONTROLLING ENERGY FLOWS BETWEEN COMPONENTS OF AN ENERGY SYSTEM

(71) Applicant: Siemens Aktiengesellschaft, Munich (DE)

(72) Inventors: Stefan Niessen, Erlangen (DE); Sebastian Schreck, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 496 days.

(21) Appl. No.: 17/311,527

(22) PCT Filed: Oct. 30, 2019

(86) PCT No.: PCT/EP2019/079589
§ 371 (c)(1),
(2) Date: Jun. 7, 2021

(87) PCT Pub. No.: WO2020/114681
PCT Pub. Date: Jun. 11, 2020

(65) Prior Publication Data
US 2022/0021219 A1 Jan. 20, 2022

(30) Foreign Application Priority Data
Dec. 6, 2018 (DE) .................... 10 2018 221 156.6

(51) Int. Cl.
*H02J 3/46* (2006.01)
*H02J 3/00* (2006.01)

(52) U.S. Cl.
CPC .............. *H02J 3/46* (2013.01); *H02J 3/008* (2013.01); *H02J 2203/20* (2020.01)

(58) Field of Classification Search
CPC ........... H02J 3/46; H02J 3/008; H02J 2203/20
See application file for complete search history.

(56) References Cited

U.S. PATENT DOCUMENTS

| 11,400,827 B2 * | 8/2022 | Pettersson | B60L 53/64 |
| 2005/0200133 A1 | 9/2005 | Wobben | 290/55 |

(Continued)

FOREIGN PATENT DOCUMENTS

| CN | 101855807 A | 10/2010 | H02J 3/28 |
| CN | 107145069 A | 9/2017 | G05B 13/04 |

(Continued)

OTHER PUBLICATIONS

Corn, Marko et al., "Improved Integration of Renewable Energy Sources with the Participation of Active Customers," Strojniski Vestnik-Journal of Mechanical Engineering, vol. 4, pp. 274-282, Jan. 29, 2014.

(Continued)

*Primary Examiner* — Jared Fureman
*Assistant Examiner* — Esayas G Yeshaw
(74) *Attorney, Agent, or Firm* — Slayden Grubert Beard PLLC

(57) ABSTRACT

Various embodiments of the teachings herein include a device for controlling energy flows between components of an energy system with an energy accumulator comprising a controller for adjusting the energy flows. The controller computes the energy flows beforehand for a time domain using an optimization method, the time domain having a beginning and an end. A charge level of the energy accumulator at the end of the time domain is essentially equal to a charge level of the energy accumulator at the beginning of the time domain.

13 Claims, 1 Drawing Sheet

(56) References Cited

U.S. PATENT DOCUMENTS

| | | | |
|---|---|---|---|
| 2008/0046387 A1 | 2/2008 | Gopal | 705/412 |
| 2017/0256948 A1* | 9/2017 | Froehner et al. | |
| 2018/0062388 A1* | 3/2018 | Mathiesen | H02J 3/28 |
| 2020/0191117 A1* | 6/2020 | Li | F03D 7/046 |
| 2021/0218249 A1* | 7/2021 | Dong | B60L 53/52 |

FOREIGN PATENT DOCUMENTS

| | | | |
|---|---|---|---|
| WO | 2012 145563 | 10/2012 | G06Q 30/02 |
| WO | 2015/019299 A1 | 2/2015 | G01D 4/00 |
| WO | 2018 074973 | 4/2018 | G06Q 50/06 |
| WO | 2018 213630 | 11/2018 | H02J 3/00 |

OTHER PUBLICATIONS

Hejeejo, Rashid et al., "Planning a Decentralised and Bi-Directional Market-Based Management System," IET Renewable Power Generation, vol. 11, No. 12, pp. 1555-1564, Aug. 17, 2017.
Cui, Shichang et al., "A Two-Stage Robust Energy Sharing Management for Prosumer Micogrid"; IEEE Transactions on Industrial Informatics, vol. 15, No. 5, pp. 2741-2752, May 2, 2019.
Search Report for International Application No. PCT/EP2019/079589, 12 pages, Feb. 3, 2020.
Hu, Changpin et al., "Energy Optimization Coordination Control of Multi-sources in Microgrid," Proceedings of the CSEE, vol. 35, No. S1, pp. 36-43, Sep. 30, 2015.
Chinese Office Action, Application No. 201980080206.0, 20 pages, Sep. 12, 2023.

* cited by examiner

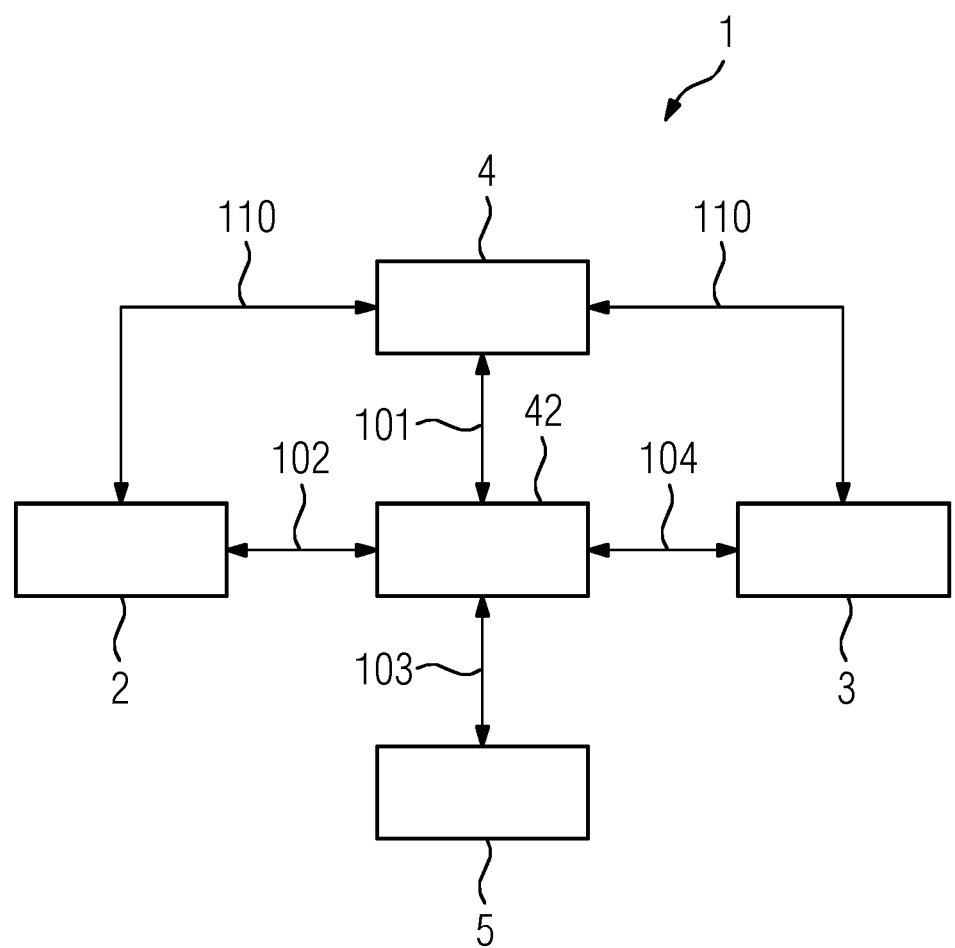

DEVICE AND METHOD FOR CONTROLLING ENERGY FLOWS BETWEEN COMPONENTS OF AN ENERGY SYSTEM

CROSS-REFERENCE TO RELATED APPLICATIONS

This application is a U.S. National Stage Application of International Application No. PCT/EP2019/079589 filed Oct. 30, 2019, which designates the United States of America, and claims priority to DE Application No. 10 2018 221 156.6 filed Dec. 6, 2018, the contents of which are hereby incorporated by reference in their entirety.

TECHNICAL FIELD

The present disclosure relates to energy systems. Various embodiments may include devices and/or methods for controlling energy flows between various components of an energy system.

BACKGROUND

Energy systems typically include a plurality of components, in particular energy generators and energy consumers. It is necessary in this case to coordinate the energy flows, that is to say the exchange of energy, typically electric current or electric energy, between the components of the energy system. The coordination can take place centrally with respect to the components by means of a coordination platform. For this purpose, the coordination platform can carry out an optimization method, by means of which the energy flows between the components are computed as efficiently or optimally as possible beforehand, for example one day ahead (day-ahead).

The coordination platform can furthermore be designed as a trading platform so that the components can make sales offers and purchase offers. The sales offers and purchase offers with respect to an energy form can be taken into consideration in the optimizing, wherein typically the maximum possible and in this meaning the most optimum possible energy sales are advantageous. For known coordination platforms, incorporating an energy accumulator proves to be difficult. This is the case because an energy accumulator couples various times and up to this point sales offers and purchase offers have had to be made simultaneously, for example for all time intervals of a following day (day-ahead spot market).

SUMMARY

The teachings of the present disclosure may enable the incorporation of an energy accumulator in a coordination platform. For example, some embodiments include a device (1) for controlling energy flows between components (2, . . . , 5) of an energy system, wherein the components (2, . . . , 5) comprise at least one energy accumulator (4), comprising a control device (42) for controlling the energy flows, wherein, by means of the control device (42), the energy flows are computable beforehand for a time domain by means of an optimization method, characterized in that the energy flows are computable and controllable by means of the control device (42) in such a way that the charge level of the energy accumulator (4) at the end of the time domain is essentially equal to the charge level of the energy accumulator at the beginning of the time domain.

In some embodiments, the components (2, . . . , 5) of the energy system comprise multiple energy generators (2) and multiple energy consumers (3), wherein the energy generators (2), the energy consumers (3), and the at least one energy accumulator (4) are connected to one another by means of an energy transmission network (110).

In some embodiments, there is a communication interface for the bidirectional exchange of data containers between the control device (42) and the components (2, . . . , 5), wherein the data stored by means of the data containers can be taken into consideration in the optimization method, in particular in secondary conditions.

In some embodiments, the data containers comprise control data provided for controlling the power flows.

In some embodiments, by means of the data containers, a maximum amount of energy that can be provided by each energy generator (2) and a maximum amount of energy (3) that can be received by each energy consumer is stored.

In some embodiments, by means of the data containers, a maximum storage capacity of the energy accumulator (4), a maximum charge power of the energy accumulator (4), a maximum discharge power of the energy accumulator (4), a charge efficiency of the energy accumulator (4), and/or a discharge efficiency of the energy accumulator (4) is stored.

In some embodiments, by means of the data containers, a minimum sale price of each energy generator (2) and a maximum purchase price of each energy consumer (4) is stored.

In some embodiments, each component (2, . . . , 5) of the energy system, in particular the energy accumulator (4), comprises a control unit coupled to the control device (42) via the communication interface for data exchange.

As another example, some embodiments include a method (1) for controlling energy flows between components (2, . . . , 5) of an energy system, wherein the components (2, . . . , 5) comprise at least one energy accumulator (4), in which the energy flows are calculated beforehand for a time domain by means of an optimization method, characterized in that the energy flows are calculated and controlled in such a way that the charge level of the energy accumulator (4) at the end of the time domain is essentially equal to the charge level of the energy accumulator (4) at the beginning of the time domain.

In some embodiments, the optimization of the energy flows is carried out under the secondary condition that the charge level of the energy accumulator (4) at the end of the time domain is essentially equal to the charge level of the energy accumulator (4) at the beginning of the time domain.

In some embodiments, a maximum amount of energy that can be provided by each energy generator (2) is taken into consideration in the optimization.

In some embodiments, a maximum amount of energy that can be received by each energy consumer (4) is taken into consideration in the optimization.

In some embodiments, a maximum storage capacity of the energy accumulator (4), a maximum charge power of the energy accumulator (4), a maximum discharge power of the energy accumulator (4), a charge efficiency of the energy accumulator (4), and/or a discharge efficiency of the energy accumulator (4) is taken into consideration in the optimization.

In some embodiments, a chronological shiftability of the energy flows for at least one of the components (2, . . . , 5) is taken into consideration in the optimization.

In some embodiments, the type of the energy flows is taken into consideration in the optimization.

BRIEF DESCRIPTION OF THE DRAWINGS

Further advantages, features, and details of the teachings herein are discussed in view of an exemplary embodiment shown in the drawing. The single FIGURE schematically shows a device according to one embodiment incorporating teachings of the present disclosure.

DETAILED DESCRIPTION

In some embodiments, a device incorporating teachings of the present disclosure for controlling energy flows between components of an energy system comprises a control device for controlling the energy flows, wherein, by means of the control device, the energy flows are computable beforehand for a time domain by means of an optimization method. In some embodiments, the components of the energy system, and thus the energy system, comprise at least one energy accumulator. In some embodiments, the energy flows are computable and controllable by means of the control device in such a way that the charge level of the energy accumulator at the end of the time domain is essentially equal to the charge level of the energy accumulator at the beginning of the time domain.

In other words, the control device is designed to control the energy flows based on the calculated solution of the optimization method in such a way that the charge level of the energy accumulator at the end of the time domain is essentially equal to the charge level of the energy accumulator at the beginning of the time domain. In some embodiments, the concept of regulation also falls under the concept of control.

In some embodiments, the charge levels of the energy accumulator at the beginning and at the end of the time domain, that is to say at the boundaries of the time domain, are essentially equal. In this case, two charge levels are essentially equal in the meaning of the present disclosure if they have a deviation from one another of at most 5%.

In some embodiments, each energy generator is designed to generate at least one form of energy and provides it for one or more energy consumers. Each energy consumer is designed to consume at least one of the forms of energy provided by the energy generators. The forms of energy of the energy generators can be different. In particular, electric current and/or thermal energy/heat is provided as a form of energy. The energy flows can thus be electric currents and/or thermal currents.

In some embodiments, a device incorporating teachings of the present disclosure forms a central coordination platform which controls the energy flows between the components of the energy system based on the solution of the optimization method (prior calculation of the energy flows) by means of the control device. The energy flows between the components of the energy system are controllable based on the solution of the optimization method by means of the control device.

An optimization method in the meaning of the present disclosure is a method for maximizing or minimizing a target function, wherein the energy flows form the optimization variables of the target function. The maximizing or minimizing of the target function is typically complex and therefore typically takes place numerically. An exact maximum or minimum of the target function is not required. The result of the optimization method are at least the energy flows between the components of the energy system. The control device controls the components of the energy system or the energy flows between the components of the energy system as much as possible according to the previously calculated energy flows. The most efficient or optimum possible operation of the energy system is thus enabled. The energy flows are typically calculated by the control device for a day (time domain) ahead.

In some embodiments, the control device is programmed to calculate and control the energy flows in such a way that the charge level of the energy accumulator at the end of the time domain is essentially equal to the charge level of the energy accumulator at the beginning of the time domain. For example, the charge level of the energy accumulator has periodic boundary conditions with respect to the time domain. Therefore, $E_{t=0}^{ES}=E_{t=T}^{ES}$, applies, wherein $E_{t=0}^{ES}$ denotes the energy stored by means of the energy accumulator at the time $t=0$ (initial charge level) and $E_{t=T}^{ES}$ denotes the energy stored by means of the energy accumulator at the time $t=T$. The beginning of the time domain was denoted here by the value $t=0$ and the end of the time domain by the value $t=T$. The time domain is typically given by $[0, t_1, t_2, \ldots, t_{N-1}, T]$, so that $t_0=0$ and $t_N=T$. For example, $t_i=i\Delta t$ is constant for $i=0, \ldots, N$, and $\Delta t$, so that the time domain is divided into equidistant time steps.

In some embodiments, the methods allow integration of the energy accumulator in a central coordination platform or trading platform, in particular in that the charge level of the energy accumulator at the end of the time domain is equal to the charge level of the energy accumulator at the beginning of the time domain. In particular, it may be ensured that the energy accumulator only provides a flexibility within the energy system or for the coordination platform. In other words, in this meaning energy is neither generated nor consumed by the energy accumulator, but only temporarily stored. An economically fairer operation of the energy accumulator within the device and thus also within a trading platform is thus furthermore enabled.

In some embodiments, the energy flows are calculated beforehand for a time domain by means of an optimization method. In some embodiments, the energy flows are calculated and controlled in such a way that the charge level of the energy accumulator at the end of the time domain is essentially equal to the charge level of the energy accumulator at the beginning of the time domain. In other words, the energy flows are controlled by means of the control device based on the calculated solution of the optimization method, wherein the calculation of the energy flows is carried out by means of the optimization method and thus the controller in such a way that the charge level of the energy accumulator at the end of the time domain is essentially equal to the charge level of the energy accumulator at the beginning of the time domain. Similar and equivalent advantages to the device result.

The optimization of the energy flows may take place under the secondary condition that the charge level of the energy accumulator at the end of the time domain is essentially equal to the charge level of the energy accumulator at the beginning of the time domain. In some embodiments, the secondary condition is mathematically defined here in such a way that the charge levels are mathematically equal, at least for the optimization.

In some embodiments, the components of the energy system comprise multiple energy generators and multiple energy consumers, wherein the energy generators, the energy consumers, and the at least one energy accumulator are connected to one another by means of an energy transmission network. The energy flows between the components of the energy system can take place via the energy transmission network, for example a power network. The energy transmission network can be a local energy transmission network with respect to the components of the energy system and can be connected or able to be coupled to a higher-order energy transmission network, in particular power network, for energy exchange. Furthermore, physical power capacities of the energy transmission network and/or the higher-order energy transmission network can be taken into consideration in the optimization, that is to say in the optimization method, which the control device carries out. Furthermore, a fee for a use of the energy transmission network and/or a fee for a use of the higher-order energy transmission network can be taken into consideration.

In some embodiments, the device comprises a communication interface for bidirectional exchange of data containers between the control device and the components, wherein the data stored by means of the data containers can be taken into consideration in the optimization method. The control device can thus communicate with the components of the energy system. Furthermore, items of information about the components can be taken into consideration by the control device in the optimization method. The device therefore forms a central communication device, control device, and coordination platform with respect to the components.

In some embodiments, the data containers comprise control data provided for controlling the power flows. In other words, the control device calculates the power flows by means of the optimization method, in particular in consideration of items of information about the components. Subsequently, the control data are transmitted to the components by means of the communication interface, wherein the control data are designed in such a way that the components are operated according to the calculated energy flows. The result of the optimization method specific to them is symbolically communicated to the components by means of the control data. A further control unit (edge device) can be provided in each case on the part of the components, which acquire the control data and control the respective component according to the acquired control data. The control device thus controls the components by means of the control units. The device thus forms a central coordination platform, which is respectively coupled for data exchange with the control units (local control units) of each component for data exchange.

In some embodiments, a maximum amount of energy that can be provided by each energy generator and a maximum amount of energy that can be received by each energy consumer is stored by means of the data container. In other words, the control device for the energy generators knows their respective maximum amount of energy that can be provided and for the energy consumers knows their respective maximum amount of energy that can be received. It may thus be ensured that the components of the energy system are operated in the scope of their technical embodiment.

The physical data or physical items of information (for example maximum amount of energy that can be provided and maximum amount of energy that can be received) can be taken into consideration as secondary conditions in the optimization method. For example, the secondary condition $P_t^{generator} \Delta t_t \leq E_{max;t}^{generator}$, applies for one of the energy generators if $E_{max;t}^{generator}$ denotes the maximum amount of energy that can be provided by the generator at the time t and $P_t^{generator}$ denotes the power of the energy generator calculated at the time t. For example, the secondary condition $P_t^{consumer} \Delta t_t \leq E_{max;t}^{consumer}$, applies for one of the energy consumers if $E_{max;t}^{consumer}$ denotes the maximum amount of energy that can be received by the consumer at the time t and $P_t^{consumer}$ denotes the power of the energy consumer (load) calculated at the time t.

In some embodiments, a maximum storage capacity of the energy accumulator, a maximum charge power of the energy accumulator, a maximum discharge power of the energy accumulator, a charge efficiency of the energy accumulator, and/or a discharge efficiency of the energy accumulator is stored by means of the data container. Improved modeling of the energy accumulator and therefore improved consideration of the energy accumulator in the optimization method is thus advantageously enabled. The mentioned physical or technical parameters of the energy accumulator can be taken into consideration as secondary conditions in the optimization method.

In particular, the secondary condition $E_t^{ES} - E_{t-1}^{ES} = [P_{charge,t}^{ES} \eta_{charge} - P_{discharge,t}^{ES}/\eta_{discharge}] \cdot \Delta t_t$ is defined for the energy accumulator, wherein $P_{charge,t}^{ES}$ denotes the present charge power (at the time t) of the energy accumulator, $P_{discharge,t}^{ES}$ denotes the present discharge power (at the time t) of the energy accumulator, $\eta_{charge}$ denotes the charge efficiency of the energy accumulator, and $\eta_{discharge}$ denotes the discharge efficiency of the energy accumulator. It is recognizable from this that the energy accumulator couples various times. Flexibility with respect to the generation and the consumption of energy is thus provided. Further secondary conditions of the energy accumulator with respect to its technical boundary condition can be $P_{charge,t}^{ES} \leq P_{charge,max}^{ES}$ and $P_{discharge,t}^{ES} \leq P_{discharge,max}^{ES}$, wherein $PE_{charge,max}^{ES}$ denotes the transmitted maximum charge power of the energy accumulator and $P_{discharge,max}^{ES}$ denotes the transmitted maximum discharge power of the energy accumulator. The mentioned physical or technical parameters of the energy accumulator, in particular its maximum charge power and maximum discharge power, can also be time-dependent, i.e., can have an index t. Further physical or technical parameters can be provided and taken into consideration in the secondary conditions of the optimization method or can be taken into consideration by the control device in the optimization method.

In some embodiments, a minimum sale price of each energy generator and a maximum purchase price of each energy consumer is stored by means of the data container. The device thus forms a trading platform, in particular a local energy market. The minimum sales prices and the maximum purchase prices are taken into consideration in the optimization method. The probability of an energy flow between components of the energy system is thus increased, so that the energy market can be operated as energetically efficiently as possible.

In some embodiments, each component of the energy system, in particular the energy accumulator, comprises a control unit (English: edge device) coupled to the control device via the communication interface for data exchange. Data containers or data or items of information can thus be exchanged between the control device and the components. Furthermore, a global control of the components by the device is enabled in this way, wherein the components are controlled according to the solution of the optimization method. The most energetically efficient possible operation of the device, in particular of the energy market, is thus enabled.

In some embodiments, a chronological displaceability of the energy flows for at least one of the components is taken into consideration in the optimization. Chronologically shiftable loads, for example charging an electric vehicle, can thus be taken into consideration in the optimization method. For example, the consideration is carried out by the secondary condition $\Sigma_{t_{start}}^{t_{end}} P_t^{consumer} \cdot \Delta t_t \leq E_{max}^{consumer}$, so that only the sum of the amounts of energy is less than or equal to the maximum amount of energy that can be received. The time of the receiving of the amount of energy within the time domain from $t_{start}$ to $t_{end}$ is thus not relevant. The amount of energy supplied in this time domain merely cannot exceed the maximum amount of energy that can be received. The time domain from $t_{start}$ to $t_{end}$ is a real subset of the time domain T or the entire time domain T.

In some embodiments, the type of the energy flows is taken into consideration in the optimization. For example, various types of current are thus differentiable, in particular current from renewable energy sources and current from nonrenewable energy sources. The energy consumers can thus transmit preferences for a type of current to the control device. For example, current is preferably to be obtained from photovoltaic systems. These preferences of the energy consumers can be taken into consideration in the optimization method. A consideration of further preferences of the energy consumers and/or energy generators in the optimization method is possible and provided.

As shown in the FIGURE, one embodiments of the device 1 comprises energy generators 2 and energy consumers 3. Furthermore, the device comprises one or more energy accumulators 4 and one or more chronologically shiftable loads 5, for example an electric vehicle. The energy generators 2, the energy consumers 3, and also the energy accumulators 4 and the chronologically shiftable load 5 form the components 2, ..., 5 of an energy system. In other words, the energy system comprises the energy generators 2, the energy consumers 3, the energy accumulators 4, and the chronologically shiftable load 5, wherein the energy flows between the components 2, ..., 5 of the energy system can be controlled, in particular regulated, by means of a control device 42. The device 1 comprises the control device 42.

The control device 42 is designed to calculate the energy flows between the components by means of an optimization method for a time domain, for example from t=0 to t=T. Physical or technical parameters, which are transmitted from the components to the control device 42, are required for this purpose. The energy generators 2, the energy consumers 3, and the energy accumulators 4 are coupled for exchanging energy (energy flows) by means of an energy transmission network 110, for example a current network. In other words, the energy transmission network 110 enables the energy flows between the components of the energy system.

Furthermore, the control device 42 has a data connection to each component 2, ..., 5 of the energy system, for example by means of a communication interface. The data connections are illustrated by the arrows 101, ..., 104 and are identified in the following by the same reference signs. The data connections 101, ..., 104 can be made unidirectional or bidirectional. In principle, a data exchange, for example, by means of data containers, between the control device 42 and the components 2, ..., 5 of the energy system can take place by means of the data connections 101, ..., 104.

The energy generators 2 transmit by means of the data connection 102 at least their amount of energy $E_{max,t}^{generator}$ that can be provided at maximum at a time t, for example in kilowatt hours, and their minimum sales price $c_{min,t}^{generator}$, for example in cents per kilowatt hour, to the control device 42. In some embodiments, a carbon dioxide emission and/or a primary energy use can be transmitted to the control device 42. The data container, by means of which the amount of energy that can be provided at maximum at a time t and the minimum sales price $c_{min,t}^{generator}$ at the time t is stored, can be referred to as a sales offer (buy order).

The energy consumers 3 transmit by means of the data connection 104 at least their maximum amount of energy $E_{max,t}^{consumer}$ that can be received at a time t, for example in kilowatt hours, and their maximum purchase price $c_{max,t}^{consumer}$, for example in cents per kilowatt hour, to the control device 42. In some embodiments, a carbon dioxide emission and/or a primary energy use can be transmitted to the control device 42. The data container, by means of which the maximum amount of energy that can be provided at a time t and the minimum sales price $c_{min,t}^{generator}$ at the time t is stored, can be referred to as a purchase offer (buy order).

The at least one energy accumulator 4 transmits by means of the data connection 101 at least its maximum storage capacity $E_{max}^{ES}$ that can be provided, for example in kilowatt hours, an initial charge level $E_{t=0}^{ES}$, for example in kilowatt hours, its maximum charge power $P_{charge,max}^{ES}$, for example in kilowatts, its maximum discharge power $P_{discharge,max}^{ES}$, for example in kilowatts, its charge efficiency $\eta_{charge}$, for example in percent, its discharge efficiency $\eta_{discharge}$, for example in percent, and a possible time-dependent minimum payment $c_{discharge,min,t}^{ES}$ for each discharged amount of energy, for example in cents per kilowatt hour. The data container, by means of which the parameters mentioned for the energy accumulator are stored, can be referred to as a storage offer (storage order).

The at least one shiftable load 5 (shiftable consumption; shiftable load, abbreviated SL) transmits by means of the data connection 103 at least its maximum receivable amount of energy $E_{max}^{SL}$ in a shift time frame $T^{SL}$ ($=[t_{start}, t_{end}]$), for example in kilowatt hours per $T^{SL}$, its possible time-dependent maximum installed power $P_{max,t}^{SL}$, for example in kilowatts, and a possible time-dependent maximum receiving payment $c_{max,t}^{SL}$, for example in cents per kilowatt hour, to the control device 42. The data container, by means of which the parameters mentioned for the shiftable load 5 are stored, can be referred to as a flexibility offer 1 (flex-buy order 1).

In some embodiments, a shiftable generation (not shown) can be provided. The generation units which include a chronologically shiftable generation transmit, for example, by means of the data connection 102 at least one maximum amount of energy $E_{max}^{gnerator,SL}$ that can be provided in a further shift time frame $T^{Erzeuger,SL}$, for example in kilowatt hours per $T^{generator,SL}$, a possible time-dependent maximum installed power $P_{max,t}^{generator,SL}$, for example in kilowatts, and a possible time-dependent maximum sales payment $c_{max,t}^{generator,SL}$, for example in cents per kilowatt hour, to the control device 42. The data container, by means of which the parameters mentioned for the shiftable generators are stored, can be referred to as a flexibility offer 2 (flex-buy order 2).

The data or parameters transmitted by means of the data container are used for parameterization of the optimization method. An optimization method typically comprises a target function which is to be minimized or maximized. The target function comprises variables, the values of which are the result of the optimization method, and parameters, which do not change when carrying out the optimization. The optimization method is parameterized when all parameters have a specific value. The variables of the optimization method are the energy flows between the components in the present case. The energy flows are typically calculated a day ahead, i.e., for the coming day. The target function can be a total carbon dioxide emission of the energy system, a total primary energy use of the energy system, and/or the total costs of the energy system.

In some embodiments, a target function according to the above-mentioned parameters is given by $$\sum_{t,n,k} \left( P_{t,n,k}^{generator} c_{min,t,n,k}^{generator} - P_{t,n,k}^{consumer} c_{max,t,n,k}^{consumer} + P_{discharge,t,n,k}^{ES} c_{discharge,t,n,k}^{ES} + \sum_i P_{i,n,t} c_{fee,i,n,t}^{G} \right) \cdot \Delta t_t$$

wherein $P_{t,n,k}^{generator}$, $P_{t,n,k}^{consumer}$, $P_{discharge,t,n,k}^{ES}$, and $P_{i,n,t}$ are the variables. The optimization method which is carried out by means of the control device minimizes the mentioned target function and ascertains or calculates the variables $P_{t,n,k}^{generator}$, $P_{t,n,k}^{consumer}$, $P_{discharge,t,n,k}^{ES}$, and $P_{i,n,t}$. In this case, $P_{t,n,k}^{generator}$ is the power of the energy generator k at the network node n at the time t, $P_{t,n,k}^{consumer}$ is the power of the energy consumer k at the network node n at the time t, $P_{discharge,t,n,k}^{ES}$ is the discharge power of the energy accumulator k at the network node n at the time t, and $P_{i,n,t}$ is the effective line capacity between a network node i and the network node n at the time t, wherein a network fee $c_{fee,i,n,t}^{G}$ is due for this purpose for the use of the energy transmission network 110.

The optimization problem, i.e., the calculation of the maximum or minimum of the target function, is typically produced under secondary conditions. For example, the following has to be physically fulfilled:

$$\sum_k P_{t,n,k}^{generator} - \sum_k P_{t,n,k}^{consumer} + \sum_i P_{i,n,t} - \sum_i P_{n,i,t} - \sum_k P_{charge,t,n,k}^{ES} + \sum_k P_{discharge,t,n,k}^{ES} = 0$$

for all n and t.

Furthermore, secondary conditions $P_t^{generator} \Delta t_t \le E_{max;t}^{generator}$ are provided for each energy generator 2, and $P_t^{consumer} \Delta t_t \le E_{max;t}^{consumer}$ are provided for each energy consumer 3, and also $P_{charge,t}^{ES} \le P_{charge,max,t}^{ES}$, $P_{discharge,t}^{ES} \le P_{discharge,max,t}^{ES}$, and $E_t^{ES} - E_{t-1}^{ES} = [P_{charge,t}^{ES} \eta_{charge} - P_{discharge,t}^{ES}/\eta_{discharge}] \cdot \Delta t_t$ are provided for the energy accumulator 4. According to the invention, $E_{t=0}^{ES} = E_{t=T}^{ES}$ is a secondary condition for the energy accumulator 4. In other words, this secondary condition ensures that the energy accumulator 4 has essentially the same charge level at the end of the time domain, i.e., at the time t=T, as at the beginning of the time domain, i.e., at the time t=0. The energy accumulator 4 thus has essentially the same charge level $E_0^{ES} = E_{t=0}^{ES}$ at the beginning and at the end of the time domain. The energy accumulator 4 thus solely forms a flexibility which enables a decoupling of energy generation and energy consumption.

The shiftable load 5 can be modeled by means of the secondary condition $\sum_{t_{start}}^{t_{end}} P_t^{consumer} \cdot \Delta t_t \le E_{max}^{consumer}$ and thus taken into consideration in the optimization method.

In some embodiments, further physical/technical secondary conditions, for example that powers only assume positive values, or network boundary conditions, can be taken into consideration. In particular the type of a current, for example, current from photovoltaic generation, and/or preferences of the energy consumers and/or preferences of the energy generators can be taken into consideration in the optimization method by means of further secondary conditions. For multiple types of current (current types), the above equations each apply individually. In the case of equations having physical basis, for example physical boundary conditions for the energy accumulator 4, the sums of the powers from the individual current types are formed.

After the calculation of the energy flows by means of the control device 42, these calculated values are transferred to the respective components 2, . . . , 5, that is to say transmitted by means of the control device 42 or via the communication interface of the control device 42. It is thus ensured that the components 2, . . . , 5 and thus the energy system is operated in the best possible way according to the solution of the optimization method. In other words, the control device controls the components based on the solution of the optimization method. The efficiency of the energy system, for example, maximum energy sales, is thus improved. This is the case in particular because the energy accumulator 4 enables a flexibility and this can be taken into consideration by the present invention in the optimization method. The chronologically shiftable load 5 also provides a flexibility. The device 1, which also forms a trading platform for the energy/energies, thus enables a central coordination with respect to the components 2, . . . , 5 of the energy flows between the components 2, . . . , 5 of the energy system with the incorporation of the energy accumulator 4 (flexibility).

Although the teachings herein were illustrated and described in greater detail by the exemplary embodiments, the scope of the disclosure is not thus restricted by the disclosed examples or other variations can be derived therefrom by a person skilled in the art without leaving the scope of protection of the disclosure.

LIST OF REFERENCE NUMERALS 1 device
2 energy generator
3 energy consumer
4 energy accumulator
5 chronologically shiftable load/electric automobile
42 control device
101 data exchange
102 data exchange
103 data exchange
104 data exchange
110 energy transmission network

What is claimed is:

1. A device for controlling energy flows between components of an energy system with an energy accumulator, the device comprising:
   a controller for adjusting the energy flows; and
   a communication interface for bidirectional exchange of data containers between the controller and the components of the energy system;
   wherein the controller computes the energy flows beforehand for a time domain using an optimization method, the time domain having a beginning and an end;
   wherein a charge level of the energy accumulator at the end of the time domain is essentially equal to a charge level of the energy accumulator at the beginning of the time domain; and wherein the data stored by the data containers is used in the optimization method.

2. The device as claimed in claim 1, wherein:

the energy system comprises multiple energy generators and multiple energy consumers; and the energy generators, the energy consumers, and the energy accumulator are connected to one another by means of an energy transmission network.

3. The device as claimed in claim 1, wherein the data containers comprise control data provided for controlling the power flows.

4. The device as claimed in claim 1, wherein the data containers include data representing a maximum amount of energy that can be provided by each energy generator and a maximum amount of energy that can be received by each energy consumer.

5. The device as claimed in claim 1, wherein the data containers store data indicating a maximum storage capacity of the energy accumulator, a maximum charge power of the energy accumulator, a maximum discharge power of the energy accumulator, a charge efficiency of the energy accumulator, and/or a discharge efficiency of the energy accumulator.

6. The device as claimed in claim 1, wherein the data containers store data indicating a minimum sale price of each energy generator and a maximum purchase price of each energy consumer.

7. The device as claimed in claim 1, wherein each component of the energy system comprises a control unit coupled to the controller via the communication interface for data exchange.

8. A method for controlling energy flows between components of an energy system with an energy accumulator, the method comprising:

calculating the energy flows beforehand for a time domain using an optimization method, the time domain including a beginning and an end; and controlling the energy flows so a charge level of the energy accumulator at the end of the time domain is essentially equal to a charge level of the energy accumulator at the beginning of the time domain;

wherein the optimization of the energy flows includes considering a chronological shiftability of the energy flows for at least one of the components of the energy system.

9. The method as claimed in claim 8, further comprising optimizing the energy flows using a secondary condition that the charge level of the energy accumulator at the end of the time domain is essentially equal to the charge level of the energy accumulator at the beginning of the time domain.

10. The method as claimed in claim 8, wherein optimizing the energy flows includes considering a maximum amount of energy available from each energy generator.

11. The method as claimed in claim 8, wherein optimizing the energy flows includes considering a maximum amount of energy that can be received by each energy consumer.

12. The method as claimed in claim 8, wherein optimizing the energy flows includes considering a maximum storage capacity of the energy accumulator, a maximum charge power of the energy accumulator, a maximum discharge power of the energy accumulator, a charge efficiency of the energy accumulator, and/or a discharge efficiency of the energy accumulator.

13. The method as claimed in claim 8, wherein optimizing the energy flows include considering a type of the energy flows.

* * * * *